May 8, 1956 B. S. MAXIMOFF 2,744,328
ELECTRIC DEVIATION GAGE FOR SHORAN STRAIGHT LINE INDICATORS
Filed April 21, 1952 2 Sheets-Sheet 1

INVENTOR.
BORIS MAXIMOFF
BY Wade Koontz AND
Frederick W. Cotterman
ATTORNEYS

May 8, 1956          B. S. MAXIMOFF          2,744,328
ELECTRIC DEVIATION GAGE FOR SHORAN STRAIGHT LINE INDICATORS

Filed April 21, 1952          2 Sheets-Sheet 2

INVENTOR.
BORIS MAXIMOFF
BY Wade Koontz AND
Frederick W. Cotterman
ATTORNEYS

United States Patent Office 2,744,328
Patented May 8, 1956

2,744,328
ELECTRIC DEVIATION GAGE FOR SHORAN STRAIGHT LINE INDICATORS

Boris S. Maximoff, Chicago, Ill., assignor to the United States of America as represented by the Secretary of the Air Force Application April 21, 1952, Serial No. 283,498

4 Claims. (Cl. 33—1)

This invention relates to improvements in straight line indicators and more particularly to a device which greatly increases the sensitivity of the error-indicating means on the Shoran Straight Line Indicator as said indicator appears in Patent No. 2,591,698 to J. E. Henry dated April 8, 1952.

Also in a copending application Serial No. 277,682 filed March 20, 1952, now Patent No. 2,659,634 issued November 17, 1953, I disclose an improvement in the lead screw supporting mechanism of Patent No. 2,591,698 supra which is adapted to increase the performance of the Shoran Straight Line Indicator as it is shown and described in said patent.

The Shoran Straight Line Indicator is presently being used in photographing large rectangular areas of terrain from an aircraft, wherein the aircraft starts at one corner of the area, flies straight for the length of the area, turns and flies straight and parallel to the first pass or strip back to the edge of the terrain from which it started, and repeats this cycle back and forth, taking shots at such time intervals as will provide slight overlap between one shot and the next until the desired area is covered.

In carrying out the above procedure it is further required that the craft maintain its altitude constant; that the several strips or passes all be flown in a straight line; that the strips be parallel to each other; and that the strips overlap each other a predetermined distance.

In the original Shoran Straight Line Indicator, now Patent No. 2,591,698 supra, the runner which moves along the rail of the device, includes a deviation-indicating means which is for the most part mechanical, and while it operates satisfactorily in most cases, it lacks the necessary sensitivity for extremely accurate performance.

In an effort to obtain the desired indicator sensitivity, the small deviations of the lead screw coupling from the center of the "runner" were first magnified by using a movement-increasing gear train which in turn drove the potentiometer. The electrical output of the potentiometer was then used to operate the potential difference indicating meter. This arrangement had the disadvantage that a large amount of friction was introduced in the gear train and the potentiometer arm. This friction caused sticking which limited the sensitivity of the indicator.

In the instant application it is proposed to eliminate the objectionable gearing and potentiometer arm and its attendant friction by means of an electrical unit built on and made a part of the runner. This unit is disclosed in the following specification and shown in the accompanying drawing, wherein, Fig. 1 is a plan view of a Shoran Straight Line Indicator equipped with the deviation indicating means which is the subject of this invention. The indicator here shown is that part of the mapping system which is carried on the plane.

Figs. 2 and 3 are drawn to a somewhat enlarged scale and constitute the important features of the invention.

Figure 1:
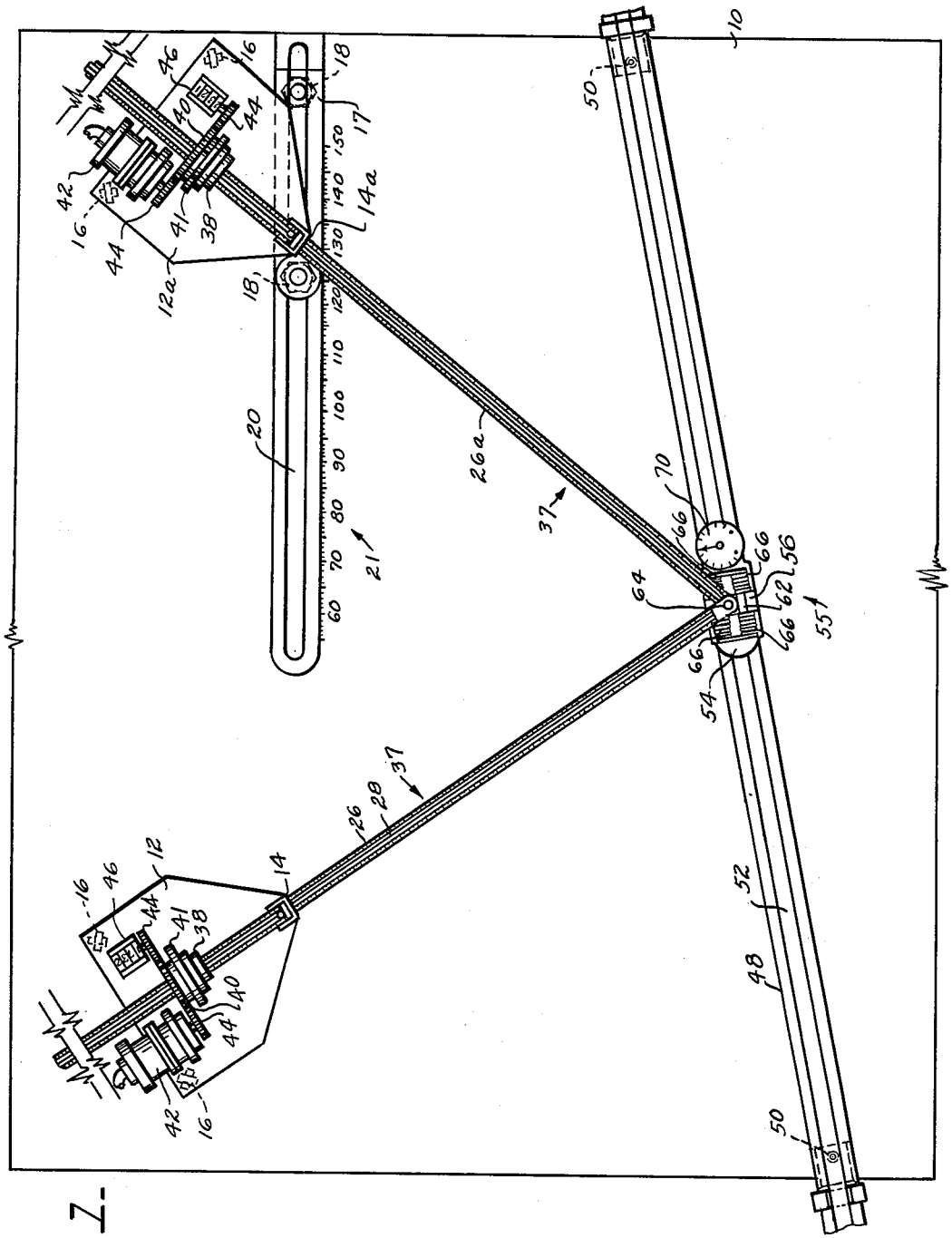
Figure 2:
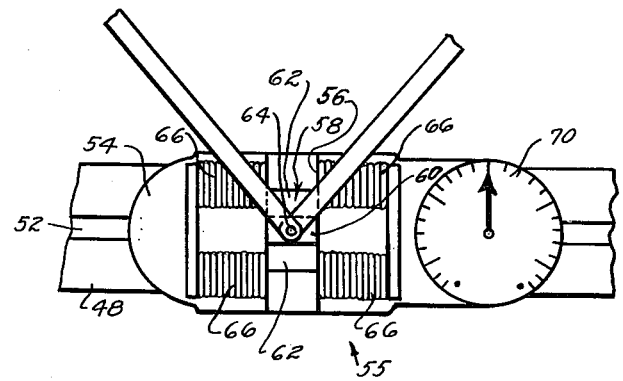
Fig. 2 is a top plan view of the runner.

Inasmuch as the present invention is an improvement on the Shoran Straight Line Indicator, a brief description of that which is old may be in order to facilitate a better understanding of the invention.

Two ground radio stations are selected preferably from fifty to one hundred twenty-five miles apart and preferably about the same distance from the area which is to be photographed. If no suitably spaced stations are available then two relatively low-power stations may be temporarily set up. A third station is carried on an aircraft which is at the area which is to be mapped. One of the ground stations is termed the rate station and the other the drift station.

The air borne station transmits series of rate pulses and series of drift pulses at different frequencies during alternate intervals of about $\frac{1}{10}$ second. Each rate pulse triggers the ground station tuned to the rate frequency, which transmits a pulse back to the airborne station. Similarly the drift station is triggered by each drift pulse and transmits a pulse to the equipment in the airplane.

The time required for the rate and drift pulses to travel to the corresponding ground stations and back to the airplane is indicative of the distance between the airplane and the two ground stations. These distances are referred to as the Shoran distances, and the airborne equipment is so graduated that the Shoran distances may be read directly in miles.

Considering the distance between the two ground stations as the base of a triangle wherein the sides adjacent are the Shoran distances and the apex is the converging point of the Shoran distances on the aircraft, a facsimile of the triangle in miniature, made to a scale of one-millionth to one is provided and carried on the aircraft. This facsimile is the basic structural portion of the straight line computer and comprises a base 10 and carriages 12 and 12a, the carriages being supported at the forward ends on pivoting lead screw supports 14 and 14a and at the rearward ends on rollers 16. The pivoting lead screw supports 14 and 14a are fixed to the carriages 12 and 12a and rotatable in the base 10 and in an adjusting block 17 respectively, and are spaced apart from each other a distance which represents, to a scale of one one-millionth to one, the distance between the rate station and the drift station.

Where existing stations have been selected as rate and drift stations for mapping an area, the distance between pivoting members 14 and 14a may be set in accordance with the distance between the two selected stations by loosening the nuts 18 and sliding the block 17, which carries the pivoting member 14a, endwise in the channel 20 to that graduation 21 which represents the desired distance, and the nuts then retightened.

The pivoting lead screw supports 14 and 14a are of rectangular cross section above the carriages 12 and 12a and are round below the carriages, the round part being pivoted in the base 10. The lead screw supports are provided with relatively long and thin lead screws 26 and 26a which are threaded externally but slidable axially in their lead screw supports. Gears 40 are threaded internally to fit the external threads on the lead screws, the hubs of gears 40 being externally machined to provide rotative bearing in bearing bracket 41 for the gears 40 on the threaded lead screws 26 and 26a.

Self synchronizing motors 42 are mounted, one on each carriage, the motors being provided with pinions 44 in constant mesh with the gears 40. Additional pinions 44, also in constant mesh with gears 40 are provided for rotating the counters 46.

A rail 48 is secured to the base 10 at its ends by clamps 50. Rail 48 has a guide groove 52 throughout its length along which a runner 54 is slidable.

The forward ends of the lead screws 26 and 26a are flattened and converge in a pivot pin 64 which is fast in the flattened end of one rod and rotatable in the flattened end of the other. The distances between the pivoting pin 64 and the pivoting members 14 and 14a are representative, to a scale of one one-millionth to one, of the distances from the aircraft to the rate station and the drift station respectively.

The runner assembly, which may be broadly designated by the numeral 55, comprises a runner body 54 arranged to slide longitudinally along the groove 52 in the rail 48. A shorter groove 56 extends transversely in the top of the runner body and a cross slide 58 is slidable in this shorter groove at right angles to the groove 52. The cross slide 58 comprises a central pad 60 of non magnetic material faced at both ends by slugs 62 of magnetic material. The pivot pin 64 which hinges the ends of the two lead screws 26 and 26a together extends also downwardly into the non magnetic pad 60 thereby hinging it to the ends of the lead screws 26 and 26a.

Rectangularly spaced and secured to the top of the runner body 54 are four electromagnetic coils 66, connected together and to an A. C. current source 68 as arms of an A. C. impedance bridge, the output of the bridge being received by a phase sensitive volt meter 70.

The magnetic slugs 62 are so spaced transversely with respect to the axes of the coils 66 that a deviation of the lead screw pivot pin 64 from one to the other side of the center line of the rail 48 increases the inductance of two of the axially aligned coils and decreases the inductance of the other two. This unbalances the bridge. The indicator 70, which serves as a pilot's direction finder, shows also the magnitude of the deviation. The course can then be corrected by manual operation of the motors 42 or by connection of the motors to an automatic pilot.

By using rail assemblies of special shapes it is possible to fly circular, figure eight, or other desired flight courses over any desired area within the range of Shoran signals. Such courses will find applications in target aircraft guided missiles, flight testing etc.

True ground speed of the airplane may be accurately determined by the measurement of runner speed along the rail. This speed may be measured in a number of ways such as (a) using mechanical speed indicators of conventional design, (b) by electrical tachometer type generators geared to a rack on the rail and connected to an electrical indicator, or by (c) electronic differentiating and indicating networks connected to a slide wire extending along the rail assembly.

Figure 3:
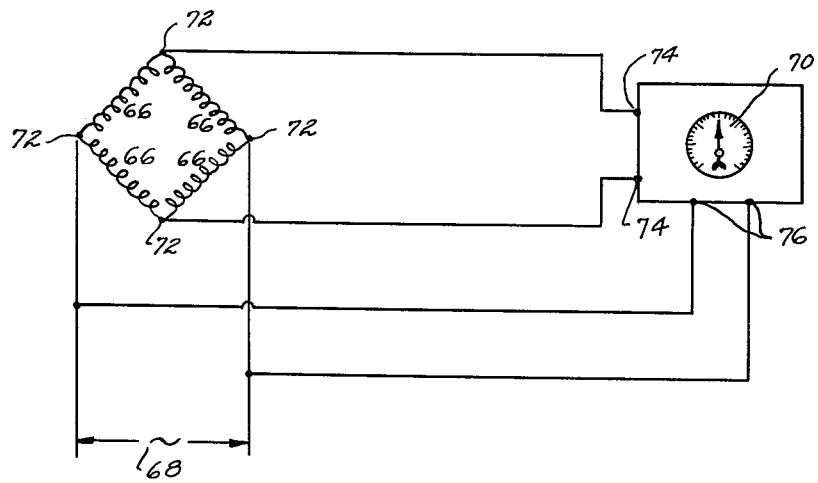
Fig. 3 is a wiring diagram of the electric circuit.

In the wiring diagram Fig. 3, the four coils 66 are joined at the ends to terminals 72, two of the terminals 72 being connected across an A. C. power source 68 and the other two of the terminals 72 being connected to the phase sensitive volt meter 70 at 74. To provide a phase reference for the volt meter 70, connection is made at 76 from the volt meter 70 to the A. C. source 68.

Having described by invention, I claim:

1. In a Shoran Straight Line Computer including means establishing fixed reference points on a substantially plane surface corresponding to signal stations, means pivotally and adjustably related to said means establishing fixed reference points to establish a point on said substantially plane surface corresponding to the instantaneous position of a craft relative to the signal stations, and track means arranged on said substantially plane surface corresponding to the predetermined path of the craft, a support means mounted on said track means for movement thereon, a guide means on said support means transverse of said track means, a slide mounted in said guide means having magnetic means at each end thereof and pivotally connected to said means pivotally and adjustably related at the point established thereby corresponding to the instantaneous position of the craft relative to the signal stations, electromagnetic means arranged to either side of said guide means in spaced aligned relation and so connected to form a bridge, and a source of power to said bridge, whereby on deviation of the craft from its predetermined path there is a corresponding movement of the slide in the guide means to unbalance the bridge and provide a signal proportional to the deviation of the craft from its predetermined path.

2. In a Shoran Straight Line Computer including means establishing fixed reference points on a map corresponding to signal stations, means pivotally and adjustably related to said fixed reference points to establish a point on the map corresponding to the instantaneous position of a craft relative to the signal stations, and track means arranged on the map corresponding to the predetermined path of the craft, a runner body mounted in said track means for movement thereon, a guide channel on said runner body transverse of said track means, a slide mounted in said guide channel having magnetic means at each end thereof, said slide being pivotally connected to said means pivotally and adjustably related to said fixed reference points at the point established thereby corresponding to the instantaneous position of the craft relative to the signal stations, electromagnetic coils in spaced and aligned relation arranged to either side of the guide channel and so connected to form the legs of an impedance bridge, and a source of power to said bridge, whereby on deviation of the craft from the predetermined path there is a corresponding movement of the slide in said guide channel with a corresponding unbalance of the bridge and a signal proportional to the deviation of the craft from its predetermined path.

3. In a navigational computer for guiding a craft along a predetermined path on the earth including track means establishing the predetermined path on a map and means establishing a point on said map representing the instantaneous position of the craft, a runner body mounted on said track means, a guide channel on said runner body transverse to said track means, electromagnetic coils arranged in spaced aligned relation to either side of the guide channel and connected together to form the legs of an impedance bridge, a slide arranged for movement in said guide channel having magnetic means at each end thereof, said means establishing a point on the map being pivotally connected to said slide, a source of power connected to terminals of the impedance bridge, whereby on deviation of the instantaneous position of the craft from the predetermined path a signal is provided in proportion to such deviation.

4. In a navigational computer for guiding a craft along a predetermined path on the earth including track means establishing the predetermined path on a substantially plane surface and means establishing a point on said substantially plane surface representing the instantaneous position of the craft, support means mounted on said track means for movement along said track means, a guide channel on said support means transverse to said track means, electromagnetic coils arranged in spaced aligned relation on said support means to either side of the guide channel, a slide in said guide channel having magnetic means at each end thereof, said means establishing a point on said substantially plane surface being pivotally connected to said slide, said electromagnetic coils being connected to form the legs of an impedance bridge, and a source of power for said bridge whereby on deviation of the craft from its predetermined path, there is a corresponding deviation of the point representing the instantaneous position of the craft to move the slide and provide an unbalance of the impedance bridge and a signal proportional to the deviation of the craft.

References Cited in the file of this patent
UNITED STATES PATENTS

| | | |
|---|---|---|
| 2,180,176 | Stone | Nov. 14, 1939 |
| 2,385,005 | Langer | Sept. 18, 1945 |
| 2,437,639 | Floyd | Mar. 9, 1948 |
| 2,445,455 | Rights et al. | July 20, 1948 |
| 2,591,698 | Henry | Apr. 8, 1952 |
| 2,627,119 | Graham | Feb. 3, 1953 |